(12) United States Patent
Saint-Jalmes et al.

(10) Patent No.: US 9,162,766 B2
(45) Date of Patent: Oct. 20, 2015

(54) OPTIMISED AIRCRAFT CABIN LAYOUT

(75) Inventors: Bruno Saint-Jalmes, Toulouse (FR);
Jason Zaneboni, Blagnac (FR);
Bernard Rumeau, Cornebarrieu (FR)

(73) Assignee: AIRBUS, Blagnac (FR)

( * ) Notice: Subject to any disclaimer, the term of this patent is extended or adjusted under 35 U.S.C. 154(b) by 672 days.

(21) Appl. No.: 12/746,423

(22) PCT Filed: Dec. 5, 2008

(86) PCT No.: PCT/FR2008/001697
§ 371 (c)(1),
(2), (4) Date: Sep. 7, 2010

(87) PCT Pub. No.: WO2009/101294
PCT Pub. Date: Aug. 20, 2009

(65) Prior Publication Data
US 2011/0101161 A1    May 5, 2011

(30) Foreign Application Priority Data

Dec. 6, 2007 (FR) ..................................... 07 08523
Jan. 18, 2008 (FR) ..................................... 08 00263

(51) Int. Cl.
*B64C 11/06* (2006.01)
*B64D 11/06* (2006.01)

(52) U.S. Cl.
CPC ............ *B64D 11/06* (2013.01); *B64D 11/0601* (2013.01)

(58) Field of Classification Search
CPC .... B64D 11/06; B64D 11/0601; B64D 11/00; B64D 11/0641; B60N 2/01
USPC ................. 244/122 R, 118.5, 118.6, 122 AH; 297/232, 334.1, 63, 240, 344.23, 297/344.24, 354.13, 245, 257, 354.3
See application file for complete search history.

(56) References Cited

U.S. PATENT DOCUMENTS

| 2,046,859 | A |   | 7/1936 | Weiss et al. |
| 2,414,730 | A | * | 1/1947 | Flogaus .......................... 296/64 |
| 2,632,408 | A | * | 3/1953 | Giles .............................. 105/344 |
| 2,947,349 | A | * | 8/1960 | Kryter ....................... 297/174 R |
| 3,608,958 | A | * | 9/1971 | Knabusch et al. .............. 297/69 |
| 4,936,620 | A |   | 6/1990 | Francois et al. |

(Continued)

FOREIGN PATENT DOCUMENTS

| EP | 0 126 056 | 11/1984 |
| EP | 1 495 908 A1 | 1/2005 |

(Continued)

OTHER PUBLICATIONS

Office Action issued May 28, 2013, in Russian Patent Application No. 2010127852/11 (039602) with English translation.

(Continued)

*Primary Examiner* — Valentina Xavier
(74) *Attorney, Agent, or Firm* — Oblon, McClelland, Maier & Neustadt, L.L.P.

(57) ABSTRACT

A layout for a cabin in a passenger transport vehicle, that includes at least one longitudinal aisle and seats for passengers arranged in rows, each accessible by a longitudinal aisle. At least one row of at least two seats is arranged so as to be inclined relative to a longitudinal aisle. The seats of the row are arranged side by side and oriented perpendicularly to the row and to the aisle enabling access to the row.

28 Claims, 5 Drawing Sheets

(56) References Cited

U.S. PATENT DOCUMENTS

Figure 1:
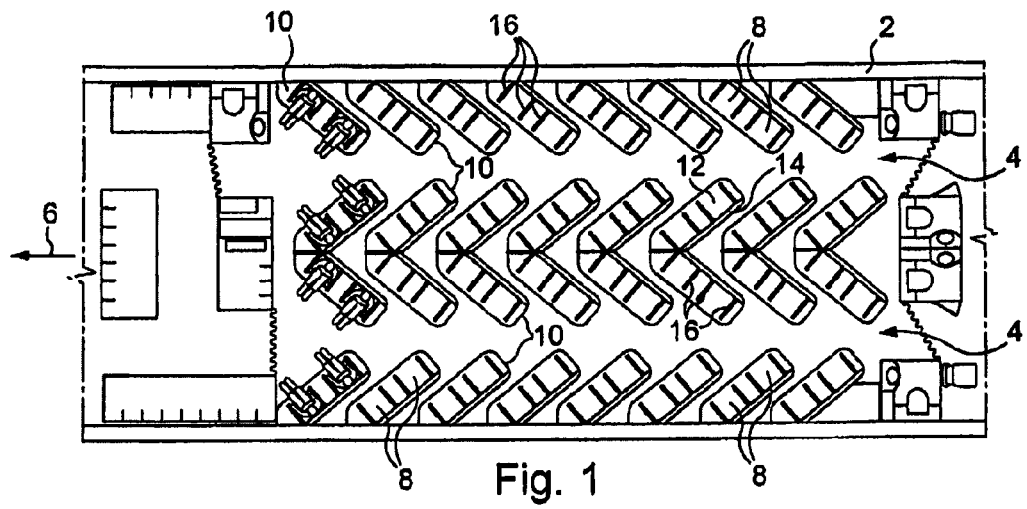

| | | | |
|---|---|---|---|
| 6,669,141 B2 * | 12/2003 | Schmidt-Schaeffer | 244/118.6 |
| 6,793,282 B2 * | 9/2004 | Plant et al. | 297/248 |
| 7,025,306 B2 | 4/2006 | Saint Jalmes | |
| 7,252,268 B2 | 8/2007 | Saint-Jalmes | |
| 7,320,446 B2 | 1/2008 | Saint-Jalmes et al. | |
| 7,578,471 B2 * | 8/2009 | Beroth | 244/118.6 |
| 7,712,704 B2 | 5/2010 | Saint-Jalmes et al. | |
| 7,721,990 B2 * | 5/2010 | Jaeger et al. | 244/118.6 |
| 7,780,115 B2 * | 8/2010 | Watanabe | 244/118.6 |
| D656,750 S * | 4/2012 | Porter et al. | D6/356 |
| D660,027 S * | 5/2012 | Porter et al. | D6/356 |
| 8,196,864 B2 * | 6/2012 | Ruiter et al. | 244/118.6 |
| 2004/0035980 A1 | 2/2004 | McDonnell | |
| 2004/0046430 A1 | 3/2004 | Plant et al. | |
| 2004/0195451 A1 * | 10/2004 | Bentley et al. | 244/118.6 |
| 2005/0242641 A1 | 11/2005 | Thompson | |
| 2007/0034742 A1 * | 2/2007 | Jaeger et al. | 244/118.6 |
| 2007/0241232 A1 | 10/2007 | Thompson | |
| 2007/0295863 A1 * | 12/2007 | Thompson | 244/118.6 |
| 2008/0042010 A1 | 2/2008 | Watanabe | |
| 2009/0146004 A1 * | 6/2009 | Plant | 244/118.5 |

FOREIGN PATENT DOCUMENTS

| | | |
|---|---|---|
| GB | 733 081 | 7/1955 |
| GB | 2 438 162 | 11/2007 |
| JP | 2005 219636 | 8/2005 |
| RU | 10655 | 8/1999 |
| SU | 1736809 | 5/1992 |
| WO | 03 053735 | 7/2003 |
| WO | 2005 014395 | 2/2005 |

OTHER PUBLICATIONS

Decision on Grant in patent application No. 2010127852/11(039602) filed Dec. 5, 2008.

* cited by examiner

OPTIMISED AIRCRAFT CABIN LAYOUT

This invention relates to an optimized layout of a cabin for a passenger-transport vehicle.

This invention relates more particularly but not exclusively to aircraft intended for commercial passenger transport. In such an aircraft, a constant concern of the individual skilled in the art is to allow as large a number of travelers as possible to travel under the best possible comfort conditions. The layout of an aircraft cabin always is a compromise between the space set aside for each passenger and the number of passengers able to be accommodated.

In aircraft intended to make long-haul flights, the passengers often are led to travel at night, and the companies then wish to offer their passengers berthing capacity. It generally is not possible for al the passengers traveling seated to enjoy a berth for sleeping.

Several solutions for laying out the interior of an aircraft cabin already have been proposed. Thus, in document FR-2 843 730 there is proposed a layout of modules in which a passenger each time may travel seated but also in lying-down position. The configuration proposed in this document allows each passenger to leave his module without having to disturb his neighbor(s).

As for document FR-2 866 840, it proposes a cabin layout in which all the passengers travel in the direction of movement and also may travel in lying-down position.

Document FR-2 873 349 proposes an alternative solution in the layout of an aircraft cabin. In fact, the aircraft cabin disclosed by this document has on a first level seating capacity intended to accommodate passengers and in the upper portion of the cabin, berths are laid out for some of the passengers thus traveling on the lower level. Whereas in the two documents cited above, a passenger remains in the same seat when he changes over from the seated position to the lying down position, in this third document one area of the cabin is set aside for the passengers when they are traveling in seated position and some of these passengers move to the berths in order to go and sleep in lying-down position.

In the known cabin layouts of the prior art, not only in the three layouts cited above but also in most of the known layouts, the interior arrangement of the cabin is difficult to adjust. It is known, for example, to adjust seats so that they may accommodate either three economy-class passengers or two passengers in business class. However, when a cabin or a cabin portion is intended to accommodate passengers in lying-down position, it accommodates the same number of passengers in seated position. The novel idea at the root of this invention is in particular to have a large number of passengers travel in an aircraft cabin for short- or medium-haul flights and to be able to change the configuration of the cabin easily when the aircraft is used on long-haul flights where it is desired to offer the passengers the option of sleeping in lying-down position.

This invention then has as a purpose to provide an aircraft-cabin layout for which both the number of passengers able to travel in seated position and the number of passengers able to travel in lying-down position are optimized.

This invention therefore has as a purpose to provide an enhanced comfort for the passengers since it should allow a larger number of them to be able to sleep in lying-down position. Advantageously, in seated position, the passengers also will have greater comfort with an increased seat width in comparison with the state of the art. Advantageously, the space between two seats located one behind the other possibly will be increased. In a layout according to the invention, it also will be advisable to limit the number of seats where the passengers have to apologize to their neighbors when they wish to leave their seat.

Another purpose of the invention is to make it possible to limit the times for boarding and deplaning of passengers.

To this end, this invention proposes a cabin in a passenger-transport vehicle comprising at least one longitudinal aisle as well as seats intended to accommodate passengers and arranged in rows each accessible via a longitudinal aisle.

According to this invention, at least one row of at least two seats is arranged so as to be slanted in relation to a longitudinal aisle, and the seats of the said row are arranged side by side and positioned perpendicular to the said row and toward the aisle allowing access to the said row.

In comparison with a standard configuration where the seats are arranged in transverse rows, in relation to a longitudinal aisle (or several aisles), it is proposed here to slant the rows of seats in relation to their transverse position. The angle of inclination is adapted to the width of the cabin of the vehicle.

In a cabin according to this invention, the comfort of the passengers is enhanced because they enjoy more space at the elbows as well as at the legs. The slant imparted to the row preferably is such that not only a passenger located at the edge of the aisle for access to the row and toward which he is positioned, but also his immediate neighbor, may leave their seat without having to disturb their neighbors and having to apologize to them. The angle of inclination is a parameter varying in particular according to the width of the cabin—or else the diameter of the fuselage of the aircraft—and the distance between two successive rows.

In an advantageous embodiment of a cabin according to this invention, two rows of seats are arranged one beside another, forming a V. It is advisable here to have a cabin wide enough to allow such a configuration. This embodiment is advantageous in that a seat may be laid out at the tip of the V formed by two rows of seats. An additional seat then may be offered for accommodating a passenger. In this way, an optimization of the space may be achieved.

An embodiment variant that may be used for cabins of lesser width provides that two rows of seats are arranged one beside the other with, however, a longitudinal offset.

In a preferred embodiment, each row of seats is capable of accommodating at least three passengers in seated position. This embodiment offers the advantage of having rows of seats wide enough to be able to accommodate a passenger in lying-down position by adding an additional berth at the end of the row, this addition possibly being, for example, the space left clear between a slanted row and a side wall of the cabin.

In order to clear the aisle(s), at least slightly, of the legs of the passengers seated beside the aisle, it is proposed, as an embodiment variant, that in at least one row comprising three or more seats, the seat at the end of the row and located by an aisle is slanted toward the other seats of the row. Such an embodiment variant possibly may be adopted according to the width of the cabin and the desired available space in the aisles. In this way, the passengers seated in such slanted seats, when they extend their legs, encroach less on the aisle. It also is observed that, for the same number of seats in each row and for a given cabin width, this embodiment variant makes it possible to slightly increase the width of the aisle(s). The slant of the seat located at the end of the row generally is on the order of a few degrees, preferably less than 30°. This value is linked to the width of the cabin being laid out.

In order to allow a cabin according to the invention to accommodate passengers in lying-down position, it advantageously is provided that at least one row of seats is convertible into two superposed berths, each seat comprising a sitting surface and a back and the backs being able to be pivoted so as to form a more or less horizontal plane surface above the sitting surfaces converted into a berth. Rows of seats in the cabin preferably are adjustable so as to be able to accommodate either two or three passengers in seated position. Such an adjustable row then may be used to accommodate three passengers when the vehicle is making relatively short trips, as well as daytime trips. On the other hand, when it is planned to suggest to the passengers that they lie down to sleep, the adjustable row is configured to accommodate two passengers. If this row is convertible into berths as mentioned above, the two passengers occupying this row both also will be able to be accommodated in lying-down position. It also may be contemplated here to provide three superposed berths. In this case, three passengers seated in a row of seats also will be able to be accommodated lying down in this row.

In one configuration according to this invention presented here by way of example, a cabin comprises two side walls and a longitudinal aisle, and slanted rows are arranged parallel to each other each time between a side wall and the longitudinal isle. This configuration is, for example, adapted to an aircraft of single-aisle type.

According to another exemplary configuration adaptable to an aircraft, a cabin according to the invention comprises two side walls and two longitudinal aisles, slanted rows are arranged parallel to each other each time between a longitudinal aisle and a side wall, and slanted rows are arranged parallel to each other each time between two longitudinal aisles.

A third exemplary cabin configuration provides that the latter comprises two side walls and two longitudinal aisles, that slanted rows are arranged parallel to each other each time between a longitudinal aisle and a side wall, and that slanted rows are arranged in Vs between the two longitudinal aisles.

In these three examples, each row of seats advantageously is convertible into two superposed berths, and the more or less triangular space between each row located along a side wall and the corresponding side wall is used to form an additional berth.

In the configurations in which two rows are arranged in the form of a V, a storage space may be laid out, for example, at each tip of a V formed by two rows of seats.

In a cabin according to this invention, all the seats preferably are positioned in the same direction, for example toward the front of the vehicle.

This invention also relates to an aircraft, characterized in that it comprises a cabin such as described above. A cabin according to this invention, however, may find a place in other vehicles intended to transport passengers for several hours, such as, for example, tour buses, trains, . . . .

Figure 2:
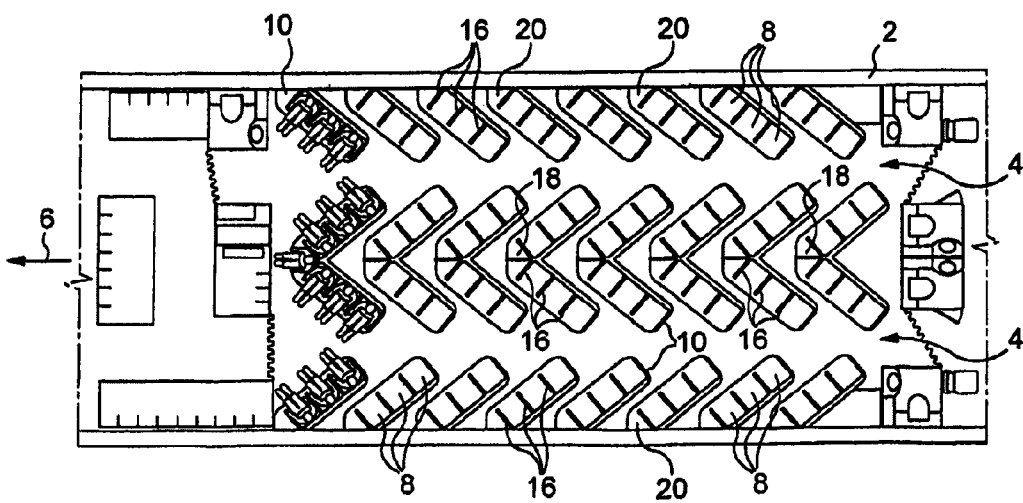
Figure 3:
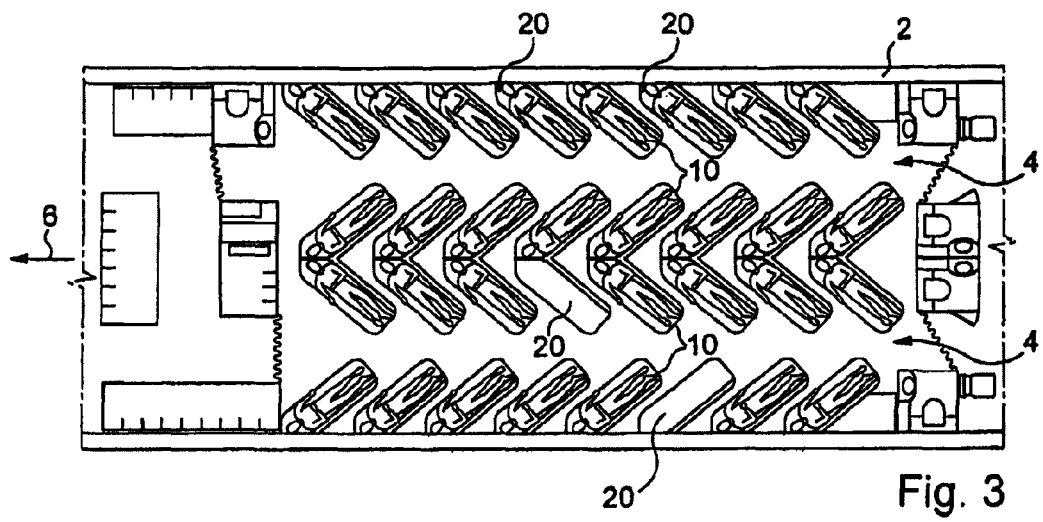
Figure 4:
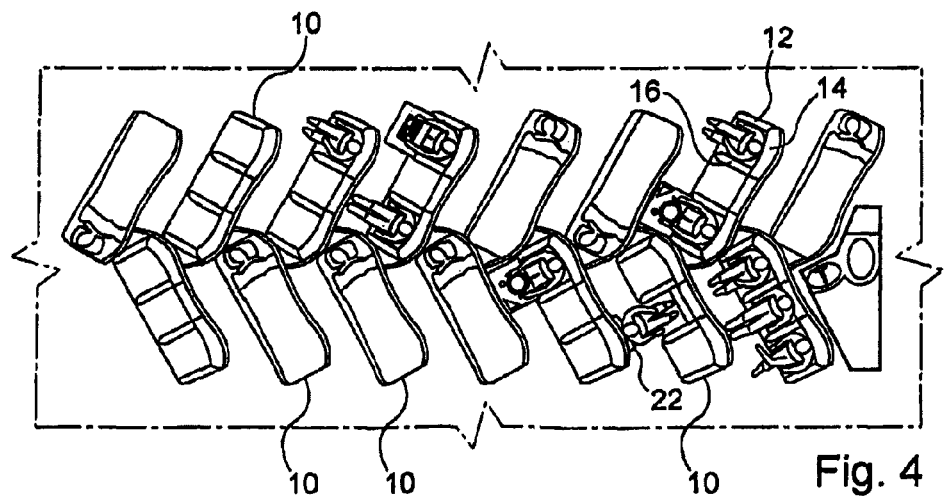
Figure 5:
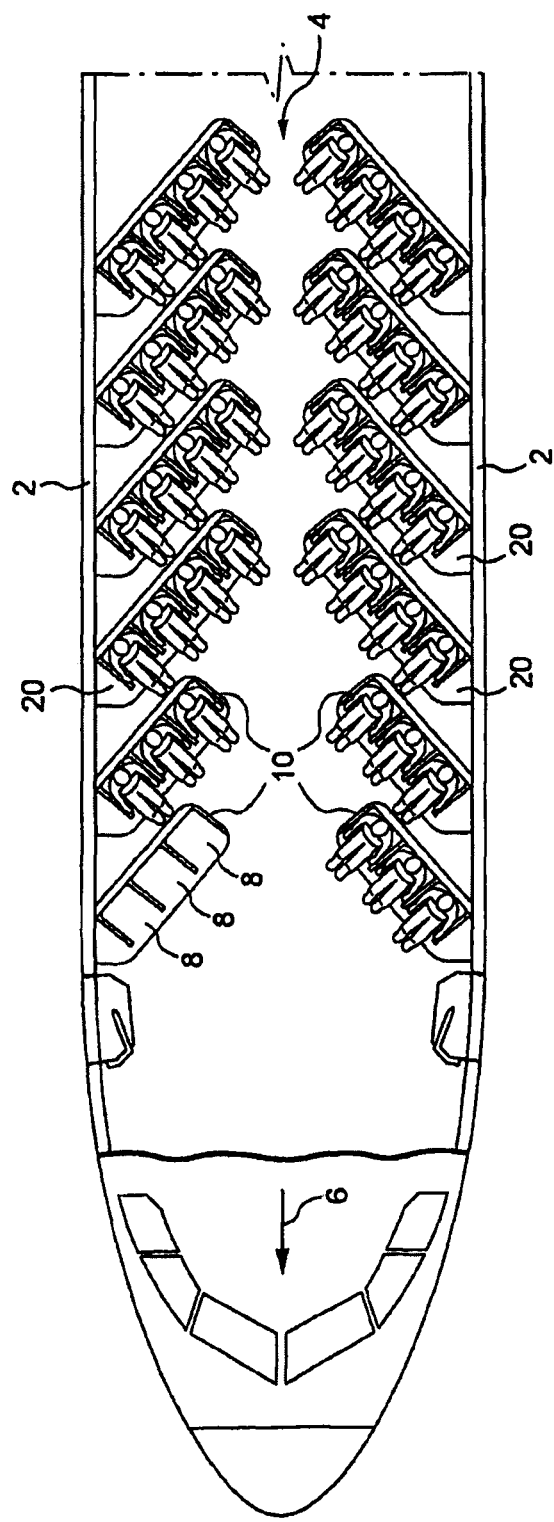
Figure 6:
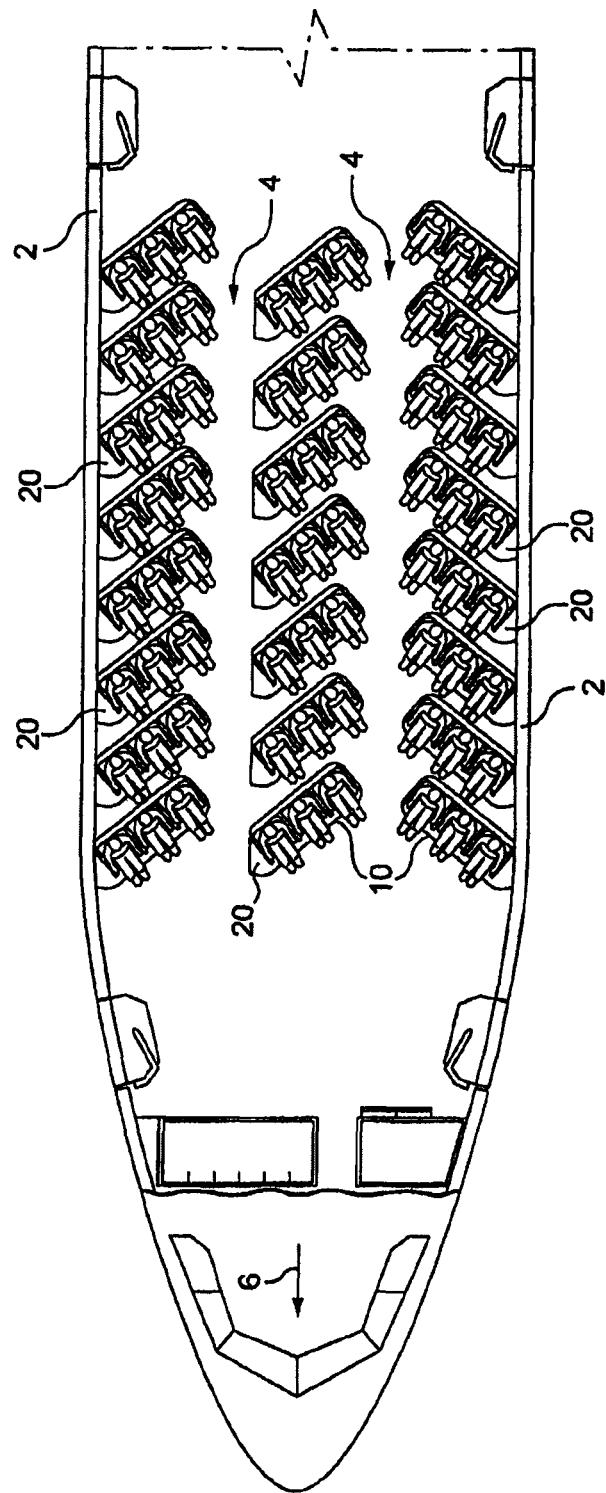
Figure 7:
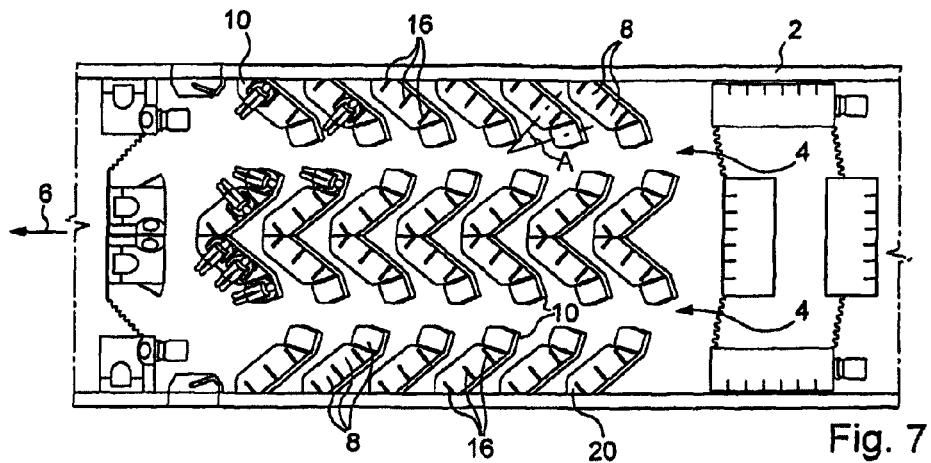
Figure 8:
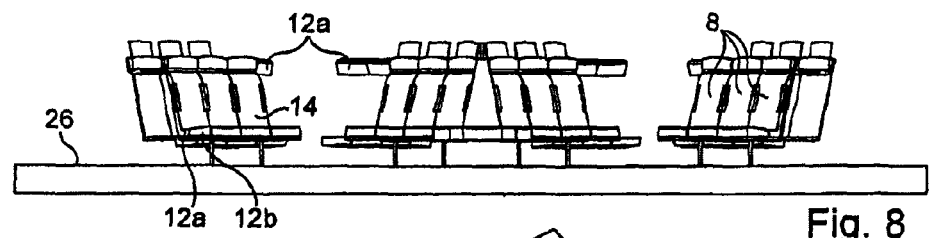
Figure 9:
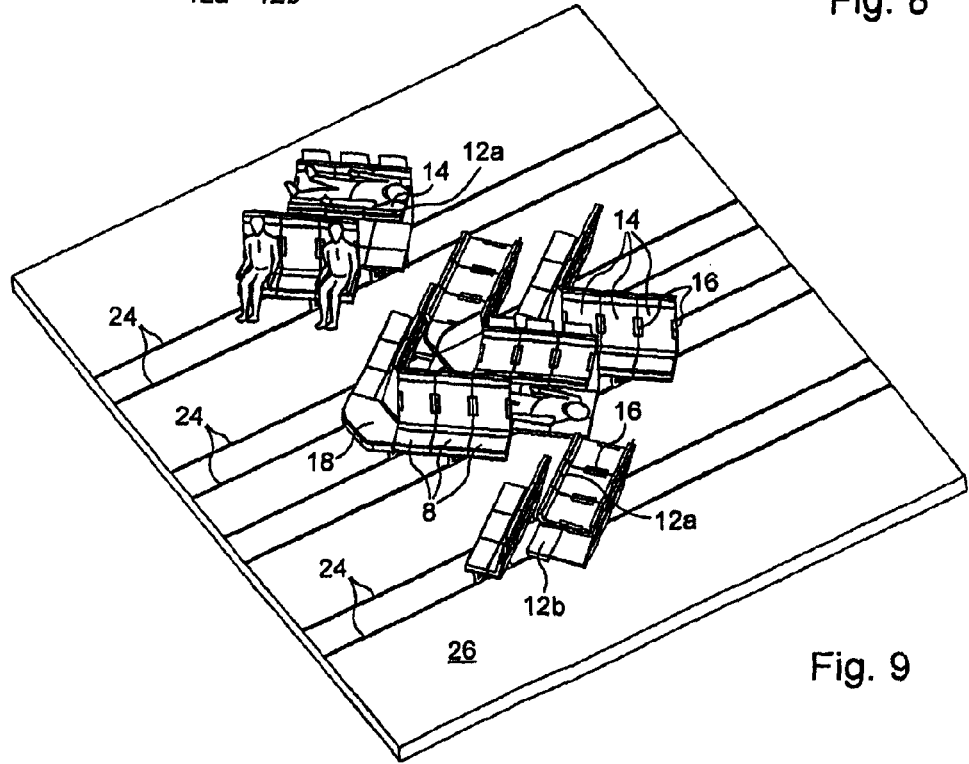

Details and advantages of this invention will become more apparent from the description that follows, presented with reference to the attached schematic drawings on which:

FIG. 1 shows a first view from above of a cabin according to the invention for a first layout thereof, FIG. 2 shows, in a view from above, the same cabin as that of FIG. 1, with a different layout, FIG. 3 shows, in a view from above, the cabin of FIGS. 1 and 2 laid out to accommodate passengers in lying-down position, FIG. 4 shows an embodiment variant in a view from above, FIG. 5 illustrates two embodiment variants of this invention adapted to a single-aisle airplane, FIG. 6 shows an embodiment variant for an airplane with two aisles, FIG. 7 shows another embodiment variant for an airplane with two aisles, FIG. 8 is an elevation of a "row" of seats in berth position as shown on FIG. 3, and FIG. 9 is a perspective view showing some seats of the embodiment of FIGS. 1 to 3.

FIGS. 1 to 3 show an aircraft cabin layout according to the invention, in a view from above.

The aircraft cabin shown here comprises, in standard manner, two side walls 2 and two longitudinal aisles 4. Standard equipment items of an aircraft cabin, which will not be described in detail here, also are recognized on these Figures. It is a matter of lavatories, storage spaces for trolleys and other wardrobe compartments. An arrow 6 on the Figures indicates the direction of flight of the aircraft.

In standard manner, there are seats 8 intended to accommodate passengers in seated position between on the one hand each side wall 2 and a longitudinal aisle 4 and on the other hand between two longitudinal aisles 4. Here, the positioning of seats 8 is entirely novel.

The seats here are arranged next to each other as in a standard aircraft configuration where the seats are organized in rows and columns. Here, however, rows 10 are not perpendicular to longitudinal aisles 4 but are slanted in relation to this aisle. Rows 10 are slanted so that on the one hand the passengers seated in seats 8 by and large look toward the front of the aircraft and on the other hand these passengers are positioned toward longitudinal aisle 4. It is observed that each row 10 of seats 8 is served by a longitudinal aisle 4. Seats 8 of a row 10 then are positioned toward longitudinal aisle 4 serving the said row 10.

In this configuration, for rows 10 located along side walls 2, seats 8 closest to the corresponding side wall are farther forward than seats 8 farther away from the corresponding side wall 2.

Seats 8 also are arranged in novel manner between two longitudinal aisles 4. Rows 10 of seats 8 are found here. These rows 10 are arranged in pairs in V form. On FIG. 1, each row 10 of seats 8 is intended to accommodate two passengers. Each seat 8 comprises a sitting surface 12 and a back 14. Armrests 16 also are provided. It is observed on FIG. 1 that the passengers are settled down comfortably and enjoy an ample seat width.

FIG. 2 shows the same aircraft cabin as that of FIG. 1. Here, however, armrests 16 shown on this Figure are positioned slightly differently in comparison with FIG. 1 and in this way each row 10 of seats 8 may accommodate three passengers. Armrests 16 may be movable armrests able to move in translation crosswise in relation to seats 8. In a preferred embodiment, however, it is provided to have two sets of armrests per row 10 of seats 8: a first set of armrests 16 for configuring row 10 so as to accommodate two passengers and a second set of armrests 16 for configuring row 10 so as to accommodate three passengers. Both armrests 16 at both ends of row 10 are common to both sets of armrests. In this way there are six armrests in all. Each of the armrests is mounted pivoting so as to be able to be retracted into a back 14. The armrest also may be covered with a fabric similar to that of corresponding back 14 so that it becomes almost invisible when it is in its turned-up retracted position. When row 10 is to accommodate two passengers, two seating places of ample width are provided, each seating place having two armrests 16 of its own. In the configuration of a row 10 used for three passengers, four of the six armrests also are used but here, for each seat, one armrest 16 is shared with the neighboring seat or seats.

On FIG. 2, there is observed the presence of an additional seat 18 laid out at the tip of each V formed by two rows 10 of seats 8. This seat is positioned in the direction of flight toward the front of the aircraft. The configuration shown on FIG. 2 therefore makes it possible to travel with thirteen passengers abreast.

In the layout proposed here, there thus are sets of two or three seats arranged side by side, without offset. The seats are positioned perpendicular to the row of seats to which they belong. Rows of seats parallel to each other are found here on each side of a longitudinal aisle. The novelty here in comparison with a standard configuration is that the rows of seats are not perpendicular to the longitudinal aisle that serves them, but slanted. This slant is such that the passengers seated in these seats are positioned toward the aisle allowing access to the said seats. This entirely novel configuration has numerous advantages. First of all, it makes it possible to have a large number of passengers travel, for a given space. On comparing FIGS. 1 and 2, it also is observed that this configuration is adjustable.

Another advantage of this configuration is that most of the passengers may leave their seats without having to disturb their neighbors. In the embodiment of FIG. 2, only the passengers located along a side wall 2 or passengers located by the tip of a V formed by two rows 10 have to apologize to their neighbors when they wish to leave their seats. These seats, however, are attractive all the same because the passengers located there have, in comparison with the others, an additional space in relation to the other passengers. It also is observed that by virtue of the slope of the rows in relation to the longitudinal aisles, all the passengers have considerable leg room.

In a configuration of seats according to the invention, three main parameters intervene. First of all there is the width of the cabin which generally depends on the diameter of the fuselage of the aircraft, this most often being of cylindrical circular shape. Then there is the distance between two rows of seats. In an aircraft cabin, this distance usually ranges between 28 and 34 inches, or between 0.71 and 0.86 m. The angle of inclination of a row in relation to the corresponding longitudinal aisle is the third main parameter. This angle preferably is chosen such that in particular according to the distance separating two rows of seats but also to the length of the cabin, the passenger next to the passenger located at the end of the row by the longitudinal aisle may leave his seat (and also access it) without having to disturb his neighbor at the end of the row and having to apologize to him.

In the embodiment of FIG. 2, at the tip of each V, it has been provided to lay out a seat 18. Other layouts, however, may be contemplated here. This space may be designed, for example, for accommodating baggage. It also may be laid out as a wardrobe for accommodating the passengers' jackets and coats. A layout as a bar also may be provided.

Another advantage of this configuration is that it facilitates service during the flight. The flight personnel may access the passengers more easily in order to serve them food and drink. Moreover, it is easier for the flight personnel to check seat belts at the time of takeoff and landing.

As illustrated on FIG. 3, the configuration of FIGS. 1 and 2 also makes it possible to accommodate passengers in lying-down position. It is provided here, as illustrated on FIGS. 8 and 9, to accommodate two passengers each time in lying-down position in each row 10. Thus, all the passengers traveling seated, as shown on FIG. 1, also may be accommodated in the cabin in lying-down position. In order to accommodate these passengers comfortably in lying-down position, the width of seats 8 forming row 10 is used and a space located at the end of each row 10 also is used. For rows 10 located close to a side wall 2, the space located between the said side wall 2 and seat 8 closest to this side wall is used here. The use of this space makes it possible to appreciably extend the length of the sleeping arrangement for the passenger. For rows located in the center, between longitudinal aisles 4, a portion of seat 18 is used to form the berth in each of the rows of the corresponding V.

In an embodiment variant, it may be provided to have not two, but three superposed berths. In this way, it is possible to offer all the passengers a place to lie down even when three passengers are occupying a row of seats.

As for FIGS. 8 and 9, they illustrate how rows 10 of seats 8 may be converted into berths. Document FR-2 753 170 shows seats convertible into berths that might be used here.

In the embodiment shown, it is observed that in order to change over from the seated position to the lying-down position, backs 14 are pivoted by approximately 90° (a little less because the backs generally are not vertical but slightly tilted). It is observed that sitting surface 12 of each seat is in two parts: a part 12a integral with back 14 and a pivoting part 12b. Part 12a therefore is pivoted with back 16 and comes to form an edge for the upper berth obtained in this way. As for part 12b of the sitting surface, it is pivoted in relation to the front edge of the sitting surface by about 180° to form the sleeping surface of the lower berth. Thus, in that way a berth that is wider than the depth of sitting surface 12 of the seat in its seating position is obtained.

On FIG. 5, two possible configurations in a single-aisle aircraft cabin are shown. This Figure illustrates that in a single-aisle type aircraft, generally designed, for example, to accommodate six passengers abreast, it is possible to increase the width of the aisle while retaining six passengers abreast or else changing over to eight passengers abreast. In these configurations, in comparison with a standard configuration, where the rows are transverse rows with six passengers abreast, the comfort of the passengers is improved. They enjoy more leg room. By the side wall, the passenger also has space and is not pressed against this wall. It also is observed that only the passenger located by a side wall (with six passengers abreast) has to apologize to his neighbor when he wishes to leave his seat. The other two passengers in the row may leave their seats without having to apologize.

FIG. 6 shows another configuration, in comparison with that of FIGS. 1 to 3, having two longitudinal aisles. Here, nine passengers travel abreast in seated position and six may travel abreast in lying-down position. Here there is a set of rows 10 of seats 8 along each side wall of the aircraft and a set of rows 10 of seats 8 that are all parallel to each other between two longitudinal aisles 4. These rows arranged between the longitudinal aisles are more or less identical to rows 10 of seats 8 located along a side wall 2. All these rows 10 of seats 8 may be converted into berths. When the passengers are in seated position, as shown on FIGS. 5 and 6, there is observed each time a space 20 at each end of the row, either by a side wall 2, or a longitudinal aisle 4. This space, more or less triangular in a view from above, may be used as a storage space for pillows and/or blankets used when the seats are converted into berths.

FIG. 4 shows another embodiment variant for a layout between two longitudinal aisles. Here the aisles no longer are arranged so as to form Vs but, in comparison with a V position, the rows are offset. This makes it possible to save space when the distance between two longitudinal aisles is limited. This FIG. 4 also shows the possibility (which also may be adopted on the other embodiments of the invention) of providing a foldaway seat 22 on the back of a row 10. This foldaway seat preferably is arranged behind seat 8 of the row located closest to the longitudinal aisle making it possible to access the said row. The use of such a foldaway seat allows two individuals to be more or less face to face, which may be easier for conversing.

FIG. 7 shows another embodiment variant for a layout of a cabin of the type shown on FIGS. 1 to 3. It is proposed here, preferably for each row 10 of seats 8, that the seat located at the end of the row by aisle 4 no longer be completely in alignment with the other seats of row 10, but be slanted toward other seats 8 of row 10 at the end of which it is located. This slant is chosen according to the width of the cabin being laid out and also the width desired for the aisles. It corresponds to the angle A formed between the axis of the slanted seat at the end of the row and the axis of another seat of the same row and is, for example, less than 45° and preferably less than 30°. FIG. 7 shows, for a slanted seat, the axis of this seat, the axis of the seat next to this slanted seat, as well as the angle A taken into consideration here.

This slant at the end of the row makes it possible to achieve a gain in the width of the aisle. Moreover, when passengers are settled down, the legs of the passengers located at the end of the row by an aisle extend less into the said aisle when the seat is a seat slanted toward the other seats than when the seat is aligned with the other seats of the row.

When a row 10 of seats 8 according to this invention is arranged between two aisles as shown, for example, on FIG. 6, the seat slant described in the preceding paragraphs preferably is implemented only at the end of the said row 10. It is observed on this FIG. 6 that in this configuration, one of the seats at the end of the row is positioned toward an aisle 4, while the other seat at the end of the row is positioned with back to the aisle. In such a scenario, the slant described above relates to the seat located at the end of the row and positioned toward the corresponding aisle.

FIG. 7 shows only rows of seats with three seats, with one seat slanted in relation to the other two seats of the row and for a given cabin layout. However, this seat slant at the end of the row may relate to rows of seats comprising a number of seats other than 3. It also may be adapted to other cabin layouts, such as for example, but not exclusively, the layouts shown on FIGS. 4 to 6.

Finally, FIG. 9 illustrates how fastening rails 24 may be laid out on floor 26 of the cabin in order to fasten rows 10 of seats 8 thereon for the implementation of this invention.

As is evident from the above description, numerous advantages may be obtained by slanting the rows of seats in relation to the longitudinal aisles as shown above. To sum up, this layout makes it possible to increase the number of passengers traveling seated in a given space while also making it possible to increase the number of passengers traveling lying down in the same space. The seated configurations also are advantageous because not many passengers have to apologize to their neighbors when they wish to leave their seats.

The proposed layout also is advantageous for the adjustability of the space, for the comfort of the passengers and for moving around in the cabin. Concerning this last point, boarding and deplaning times should be reduced with such a configuration. Also as indicated above, service on board the aircraft likewise is facilitated by the proposed configuration.

Of course, this invention is not limited to the preferred embodiments described above by way of non-limitative examples. It also relates to embodiments not cited above and within the capacity of the individual skilled in the art.

The invention claimed is:

1. A cabin in a passenger-transport vehicle, comprising:
   at least one longitudinal aisle and seats configured to accommodate passengers and arranged in rows each accessible via the at least one longitudinal aisle,
   wherein at least one row of at least two seats, referred to as a slanted row, is arranged so as to be slanted in relation to the at least one longitudinal aisle,
   the seats of the slanted row are arranged side by side along a direction of the slanted row, the direction of the slanted row being angled back with respect to the aisle allowing access to the slanted row such that seats closer to the aisle are further back than seats away from the aisle,
   and two rows of seats are arranged one beside another forming a V, and an additional seat or storage furniture is laid out at a tip of the V formed by two rows of seats and connected to a seat in each of the two rows.

2. A cabin according to claim 1, wherein at least two seats of a row are arranged side by side, without offset.

3. A cabin according to claim 1, wherein the angle of slant of a row is such that a passenger seated in the seat next to the seat arranged at the end of the row by the aisle toward which the seats of the row are positioned, may leave his/her seat without disturbing the passenger seated in the seat at the end of the row.

4. A cabin according to claim 1, wherein two rows of seats are arranged one beside the other with a longitudinal offset.

5. A cabin according to claim 1, wherein each row of seats is configured to accommodate at least three passengers in seated position.

6. A cabin according to claim 5, wherein for at least one row, the seat at the end of the row and by the aisle is slanted toward the other seats of the row.

7. A cabin according to claim 1, wherein at least one row of seats is convertible into two superposed berths, each seat comprising a sitting surface and a back and the backs configured to be pivoted so as to form a substantially horizontal plane surface above the sitting surfaces converted into a berth.

8. A cabin according to claim 1, wherein at least one row is adjustable so as to be configured to accommodate either two or three passengers in seated position.

9. A cabin according to claim 1, comprising two side walls and the at least one longitudinal aisle, and wherein slanted rows are arranged parallel to each other each time between a side wall and the at least one longitudinal aisle.

10. A cabin according to claim 1, comprising two side walls and two longitudinal aisles, wherein slanted rows are arranged parallel to each other each time between each longitudinal aisle and a side wall, and slanted rows are arranged parallel to each other each time between the two longitudinal aisles.

11. A cabin according to claim 1, comprising two side walls and two longitudinal aisles, wherein slanted rows are arranged parallel to each other each time between each longitudinal aisle and a side wall, and slanted rows are arranged in Vs, between the two longitudinal aisles.

12. A cabin according to claim 10, wherein each row of seats is convertible into two superposed berths, and a substantially triangular space between each row located along a side wall and the corresponding side wall is used to form an additional berth.

13. A cabin according to claim 1, wherein all the seats are positioned toward the front of the vehicle.

14. A cabin according to claim 1, wherein in at least one row of seats, the sitting surface of the seats includes a pivoting part that can pivot in relation to a front edge of the sitting surface by about 180° to form a sleeping surface of a lower berth.

15. A cabin according to claim 7, wherein the seating surface of the seats of at least a row of seats is in two parts, a part integral with the corresponding back and a pivoting part that can pivot in relation to the front edge of the sitting surface.

16. A cabin in a passenger-transport vehicle, comprising:
at least one longitudinal aisle and seats configured to accommodate passengers and arranged in rows each accessible via the at least one longitudinal aisle,
wherein the seats are non-rearwardly facing and are angled obliquely toward the at least one longitudinal aisle,
wherein at least one row of at least two seats, referred to as a slanted row, is arranged so as to be slanted in relation to the at least one longitudinal aisle,
wherein the seats of the slanted row are arranged side by side and along a direction of the slanted row, the direction of the slanted row being angled back with respect to the aisle allowing access to the slanted row such that seats closer to the aisle are further back than seats away from the aisle,
wherein the angle of slant of the slanted row is such that a second seat next to a first seat adjacent to the aisle toward which the seats of the slanted row are positioned is open to the aisle such that seats in a row before the slanted row do not extend in front of the second seat, and a passenger seated in the second seat may leave his/her seat without disturbing the passenger seated in the first seat.

17. A cabin according to claim 16, wherein two rows of seats are arranged one beside another forming a V.

18. A cabin according to claim 16, wherein a seat is laid out at a tip of the V formed by two rows of seats.

19. A cabin according to claim 16, wherein for at least one row, the seat at the end of the row and by the aisle is slanted toward the other seats of the row.

20. A cabin according to claim 16, wherein at least one row of seats is convertible into two superposed berths, each seat comprising a sitting surface and a back and the backs being configured to be pivoted so as to form a substantially horizontal plane surface above the sitting surfaces converted into a berth.

21. An aircraft, comprising a cabin according to claim 1.

22. A cabin in a passenger-transport vehicle, comprising:
at least one longitudinal aisle and seats configured to accommodate passengers and arranged in rows each accessible via the at least one longitudinal aisle,
wherein the seats are non-rearwardly facing and are angled obliquely toward the at least one longitudinal aisle,
wherein at least one row of at least two seats, referred to as a convertible slanted row, is arranged so as to be slanted in relation to the at least one longitudinal aisle,
the seats of the convertible slanted row are arranged side by side and along a direction of the convertible slanted row, the direction of the convertible slanted row being angled back with respect to the aisle allowing access to the convertible slanted row such that seats closer to the aisle are further back than seats away from the aisle,
and seats of the convertible slanted row are convertible into two or three superposed berths, each seat including a seating surface and a back, the back being pivotable upwards so as to form a substantially horizontal surface above seating surfaces.

23. A cabin according to claim 22, wherein a substantially triangular space between a convertible slanted row located along a side wall and the corresponding side wall is used to form an extension berth.

24. A cabin according to claim 22, further comprising:
a second convertible slanted row of seats, the convertible slanted row and the second convertible slanted row being arranged beside one another forming a V; and
an additional seat laid out at a tip of the V, a portion of the additional seat being used to form an additional berth in each of the convertible slanted row and the second convertible slanted row.

25. A cabin according to claim 22, wherein the seating surface of the seats of the convertible slanted row is in two parts, a part integral with the corresponding back and a pivoting part that can pivot in relation to the front edge of the sitting surface by about 180° to form a sleeping surface of a lower berth.

26. A cabin in a passenger-transport vehicle, comprising:
at least one longitudinal aisle and seats configured to accommodate passengers and arranged in rows each accessible via the at least one longitudinal aisle,
wherein the seats are non-rearwardly facing and are angled obliquely toward the at least one longitudinal aisle,
wherein at least one row of at least two seats, referred to as an adjustable slanted row, is arranged so as to be slanted in relation to the at least one longitudinal aisle,
the seats of the adjustable slanted row are arranged side by side and along a direction of the adjustable slanted row, the direction of the adjustable slanted row being angled back with respect to the aisle allowing access to the adjustable slanted row such that seats closer to the aisle are further back than seats away from the aisle,
and the adjustable slanted row is adjustable so as to accommodate either three passengers in a seated position in a first configuration or two passengers in a seated position in a second configuration such that the adjustable slanted row has two sets of armrests, a first set of armrests for configuring the row to accommodate three passengers and a second set of armrests for configuring the row to accommodate two passengers, wherein at least one armrest in the second set of armrests is not included in the first set of armrests.

27. A cabin according to claim 26, wherein armrests at both ends of the adjustable slanted row are each included in both sets of armrests.

28. A cabin according to claim 26, wherein each of the armrests is pivot mounted such that each armrest is configured to be retracted into a back of a seat.

* * * * *